United States Patent
Fricke et al.

(10) Patent No.: US 9,321,876 B2
(45) Date of Patent: Apr. 26, 2016

(54) PROCESS FOR PRODUCING POROUS MATERIALS BASED ON ISOCYANATE

(71) Applicant: BASF SE, Ludwigshafen (DE)

(72) Inventors: Marc Fricke, Osnabrueck (DE); Mark Elbing, Bremen (DE)

(73) Assignee: BASF SE, Ludwigshafen (DE)

(*) Notice: Subject to any disclaimer, the term of this patent is extended or adjusted under 35 U.S.C. 154(b) by 109 days.

(21) Appl. No.: 14/033,708

(22) Filed: Sep. 23, 2013

(65) Prior Publication Data

US 2014/0088215 A1    Mar. 27, 2014

Related U.S. Application Data

(60) Provisional application No. 61/706,150, filed on Sep. 27, 2012.

(51) Int. Cl.

| | | |
|---|---|---|
| *C08G 18/08* | (2006.01) | |
| *C08G 18/38* | (2006.01) | |
| *E04B 1/76* | (2006.01) | |
| *C08J 9/28* | (2006.01) | |
| *C08G 18/76* | (2006.01) | |
| *C08G 18/18* | (2006.01) | |
| *C08G 18/20* | (2006.01) | |
| *C08G 18/32* | (2006.01) | |
| *C08G 101/00* | (2006.01) | |

(52) U.S. Cl.
CPC ......... *C08G 18/0847* (2013.01); *C08G 18/1825* (2013.01); *C08G 18/2063* (2013.01); *C08G 18/3243* (2013.01); *C08G 18/3819* (2013.01); *C08G 18/7664* (2013.01); *C08J 9/28* (2013.01); *E04B 1/76* (2013.01); *C08G 2101/0066* (2013.01); *C08G 2101/0083* (2013.01); *C08G 2101/0091* (2013.01); *C08J 2201/0502* (2013.01); *C08J 2203/10* (2013.01); *C08J 2205/024* (2013.01); *C08J 2375/04* (2013.01)

(58) Field of Classification Search
CPC .......... C08G 18/0847; C08G 18/1825; C08G 18/2063; C08G 18/3243; C08G 18/3819; C08G 18/7664; C08G 2101/0066; C08G 2101/0083; C08G 2101/0091; C08J 2205/024; C08J 2375/04; C08J 9/28; C08J 2201/0502; C08J 2203/10

See application file for complete search history.

(56) References Cited

U.S. PATENT DOCUMENTS

| | | | | |
|---|---|---|---|---|
| 5,382,616 | A * | 1/1995 | Stanssens et al. | 524/394 |
| 6,063,824 | A * | 5/2000 | Krech et al. | 521/121 |
| 2010/0148109 | A1* | 6/2010 | Schadler et al. | 252/62 |
| 2012/0115969 | A1 | 5/2012 | Fricke et al. | |
| 2012/0220679 | A1 | 8/2012 | Fricke et al. | |
| 2012/0235070 | A1 | 9/2012 | Fricke et al. | |
| 2012/0248125 | A1 | 10/2012 | Fricke et al. | |
| 2013/0052393 | A1 | 2/2013 | Hahn et al. | |
| 2013/0217797 | A1 | 8/2013 | Fricke et al. | |
| 2014/0127495 | A1 | 5/2014 | Fricke et al. | |

FOREIGN PATENT DOCUMENTS

| | | |
|---|---|---|
| EP | 2 399 945 A1 | 12/2011 |
| WO | WO 2011/069959 A2 | 6/2011 |
| WO | WO 2012/000917 A1 | 1/2012 |
| WO | WO 2012/059388 A1 | 5/2012 |
| WO | WO 2012/113759 A1 | 8/2012 |
| WO | WO 2012/126742 A1 | 9/2012 |
| WO | WO 2012/130779 A2 | 10/2012 |
| WO | WO 2013/026813 A1 | 2/2013 |
| WO | WO 2013/030020 A1 | 3/2013 |

OTHER PUBLICATIONS

Search Report issued Feb. 18, 2013 in European Application No. 12186320.3 (With English Translation of Category of Cited Documents).
U.S. Appl. No. 14/104,135, filed Dec. 12, 2013, Cristadoro, et al.

* cited by examiner

*Primary Examiner* — John Cooney
(74) *Attorney, Agent, or Firm* — Oblon, McClelland, Maier & Neustadt, L.L.P.

(57) ABSTRACT

The present invention relates to a process for producing porous materials, which comprises reaction of at least one polyfunctional isocyanate with at least one polyfunctional aromatic amine in the presence of at least one catalyst and a solvent. The invention further relates to the porous materials which can be obtained in this way and the use of the porous materials as insulation material, in particular for applications in the building sector and in vacuum insulation panels.

18 Claims, No Drawings

PROCESS FOR PRODUCING POROUS MATERIALS BASED ON ISOCYANATE

The present invention relates to a process for producing porous materials, which comprises reaction of at least one polyfunctional isocyanate with at least one polyfunctional aromatic amine in the presence of at least one catalyst and a solvent. The invention further relates to the porous materials which can be obtained in this way and the use of the porous materials as insulation material, in particular for applications in the building sector and in vacuum insulation panels.

Porous materials, for example polymer foams, having pores in the size range of a few microns or significantly below and a high porosity of at least 70% are particularly good thermal insulators on the basis of theoretical considerations.

Such porous materials having a small average pore diameter can be, for example, in the form of organic aerogels or xerogels which are produced with a sol-gel process and subsequent drying. In the sol-gel process, a sol based on a reactive organic gel precursor is first produced and the sol is then gelled by means of a crosslinking reaction to form a gel. To obtain a porous material, for example an aerogel, from the gel, the liquid has to be removed. This step will hereinafter be referred to as drying in the interests of simplicity.

WO 2011/069959, WO 2012/000917 and WO 2012/059388 describe porous materials based on polyfunctional isocyanates and polyfunctional aromatic amines, where the amine component comprises polyfunctional substituted aromatic amines. The porous materials described are produced by reacting isocyanates with the desired amount of amine in a solvent which is inert toward the isocyanates. The use of catalysts is known from WO 2012/000917 and WO 2012/059388. However, these documents disclose the use of formulations comprising conventional, merely small amounts of catalysts.

However, the materials properties, in particular the mechanical stability and/or the compressive strength and also the thermal conductivity, of the known porous materials based on polyurea are not satisfactory for all applications. In particular, the thermal conductivities in the ventilated state are not sufficiently low. In the case of open-cell materials, the ventilated state is the state under ambient pressure of air, whereas in the case of partially or completely closed-cell materials such as rigid polyurethane foams this state is reached only after aging, after the cell gas has gradually been completely replaced.

A particular problem associated with the formulations based on isocyanates and amines which are known from the prior art are mixing defects. Mixing defects occur as a result of the high reaction rate between isocyanates and amino groups, since the gelling reaction has already proceeded a long way before complete mixing. Mixing defects lead to porous materials having heterogeneous and unsatisfactory materials properties. A concept for reducing the phenomenon of mixing defects is thus generally desirable.

It was therefore an object of the invention to avoid the abovementioned disadvantages. In particular, a porous material which does not have the abovementioned disadvantages, or has them to a reduced extent, should be provided. The porous materials should, compared to the prior art, have improved thermal conductivity at low pressures. In particular, however, the porous materials should have a low thermal conductivity in the ventilated state, i.e. at atmospheric pressure. Furthermore, the porous material should at the same time have a high porosity, a low density and a sufficiently high mechanical stability.

Finally, mixing defects and thus the heterogeneities in the structure and the materials properties of the porous materials formed in the reaction of the isocyanates with the amines should be avoided.

We have accordingly found the process of the invention and the porous materials which can be obtained in this way. The porous materials of the present invention are preferably aerogels or xerogels, in particular aerogels.

The process of the invention for producing a porous material comprises reacting the following components:
(a1) from 25 to 94.9% by weight of at least one polyfunctional isocyanate, and
(a2) from 0.1 to 30% by weight of at least one polyfunctional aromatic amine having the general formula I

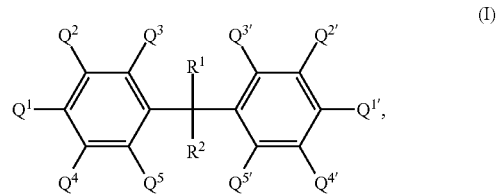

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group,
(a3) from 0 to 15% by weight of water, and
(a4) from 5 to 30% by weight of at least one catalyst,
in each case based on the total weight of the components (a1) to (a4), where the % by weight of the components (a1) to (a4) add up to 100% by weight and the reaction is carried out in the presence of a solvent (C) which is removed after the reaction.

Preferred embodiments may be found in the claims and the description. Combinations of preferred embodiments do not go outside the scope of the present invention. Preferred embodiments of the components used are described below.

The polyfunctional isocyanates (a1) will hereinafter be referred to collectively as component (a1). Analogously, the polyfunctional amines (a2) will hereinafter be referred to collectively as component (a2). It will be obvious to a person skilled in the art that the monomer components mentioned are present in reacted form in the porous material.

For the purposes of the present invention, the functionality of a compound is the number of reactive groups per molecule. In the case of the monomer component (a1), the functionality is the number of isocyanate groups per molecule. In the case of the amino groups of the monomer component (a2), the functionality is the number of reactive amino groups per molecule. A polyfunctional compound has a functionality of at least 2.

If mixtures of compounds having different functionalities are used as component (a1) or (a2), the functionality of the components is in each case given by the number average of the functionality of the individual compounds. A polyfunctional compound comprises at least two of the abovementioned functional groups per molecule.

For the purposes of the present invention, a xerogel is a porous material which has been produced by a sol-gel process in which the liquid phase has been removed from the gel by drying below the critical temperature and below the critical pressure of the liquid phase ("subcritical conditions"). An aerogel is a porous material which has been produced by a sol-gel process in which the liquid phase has been removed from the gel under supercritical conditions.

The reaction is preferably carried out using from 35 to 93.8% by weight, in particular from 40 to 92.6% by weight, of component (a1), from 0.2 to 25% by weight, in particular from 0.4 to 23% by weight, of component (a2), from 0 to 10% by weight, in particular from 0 to 9% by weight, of water and from 6 to 30% by weight, in particular from 7 to 28% by weight, of component (a4), in each case based on the total weight of the components (a1) to (a4), where the % by weight of the components (a1) to (a4) add up to 100% by weight.

The reaction is particularly preferably carried out using from 50 to 92.5% by weight, in particular from 57 to 91.3% by weight, of component (a1), from 0.5 to 18% by weight, in particular from 0.7 to 16% by weight, of component (a2), from 0 to 8% by weight, in particular from 0 to 6% by weight, of water and from 7 to 24% by weight, in particular from 8 to 21% by weight, of component (a4), in each case based on the total weight of the components (a1) to (a4), where the % by weight of the components (a1) to (a4) add up to 100% by weight.

Within the abovementioned preferred ranges, the resulting gels are particularly stable and do not shrink or shrink only slightly in the subsequent drying step.

Component (a1)

In the process of the invention, at least one polyfunctional isocyanate is reacted as component (a1).

Preferably the amount of component (a1) used is at least 35, in particular at least 40, particularly preferably at least 45% by weight, especially at least 57% by weight. Preferably the amount of component (a1) used is at most 93.8% by weight, in particular at most 92.6% by weight, particularly preferably at most 92.5% by weight, especially at most 91.3% by weight, in each case based on the total weight of the components (a1) to (a4).

Possible polyfunctional isocyanates are aromatic, aliphatic, cycloaliphatic and/or araliphatic isocyanates. Such polyfunctional isocyanates are known per se or can be prepared by methods known per se. The polyfunctional isocyanates can also be used, in particular, as mixtures, so that the component (a1) in this case comprises various polyfunctional isocyanates. Polyfunctional isocyanates which are possible as monomer building blocks (a1) have two (hereinafter referred to as diisocyanates) or more than two isocyanate groups per molecule of the monomer component.

Particularly suitable polyfunctional isocyanates are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethylbiphenyl diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

As polyfunctional isocyanates (a1), preference is given to aromatic isocyanates. Particularly preferred polyfunctional isocyanates of the component (a1) are the following embodiments:
i) polyfunctional isocyanates based on tolylene diisocyanate (TDI), in particular 2,4-TDI or 2,6-TDI or mixtures of 2,4- and 2,6-TDI;
ii) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates or crude MDI which is obtained in the production of MDI or mixtures of at least one oligomer of MDI and at least one of the abovementioned low molecular weight MDI derivatives;
iii) mixtures of at least one aromatic isocyanate according to embodiment i) and at least one aromatic isocyanate according to embodiment ii).

Oligomeric diphenylmethane diisocyanate is particularly preferred as polyfunctional isocyanate. Oligomeric diphenylmethane diisocyanate (hereinafter referred to as oligomeric MDI) is an oligomeric condensation product or a mixture of a plurality of oligomeric condensation products and thus a derivative/derivatives of diphenylmethane diisocyanate (MDI). The polyfunctional isocyanates can preferably also be made up of mixtures of monomeric aromatic diisocyanates and oligomeric MDI.

Oligomeric MDI comprises one or more condensation products of MDI which have a plurality of rings and a functionality of more than 2, in particular 3 or 4 or 5. Oligomeric MDI is known and is frequently referred to as polyphenylpolymethylene isocyanate or as polymeric MDI. Oligomeric MDI is usually made up of a mixture of MDI-based isocyanates having various functionalities. Oligomeric MDI is usually used in admixture with monomeric MDI.

The (average) functionality of an isocyanate comprising oligomeric MDI can vary in the range from about 2.2 to about 5, in particular from 2.4 to 3.5, in particular from 2.5 to 3. Such a mixture of MDI-based polyfunctional isocyanates having various functionalities is, in particular, crude MDI which is obtained in the production of MDI.

Polyfunctional isocyanates or mixtures of a plurality of polyfunctional isocyanates based on MDI are known and are marketed, for example, by BASF Polyurethanes GmbH under the name Lupranat®.

The functionality of the component (a1) is preferably at least two, in particular at least 2.2 and particularly preferably at least 2.5. The functionality of the component (a1) is preferably from 2.2 to 4 and particularly preferably from 2.5 to 3.

The content of isocyanate groups in the component (a1) is preferably from 5 to 10 mmol/g, in particular from 6 to 9 mmol/g, particularly preferably from 7 to 8.5 mmol/g. A person skilled in the art will know that the content of isocyanate groups in mmol/g and the equivalent weight in g/equivalent have a reciprocal relationship. The content of isocyanate groups in mmol/g can be derived from the content in % by weight in accordance with ASTM D-5155-96 A.

In a preferred embodiment, the component (a1) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate. In this preferred embodiment, the component (a1) particularly preferably comprises oligomeric diphenylmethane diisocyanate and has a functionality of at least 2.5.

The viscosity of the component (a1) used can vary within a wide range. The component (a1) preferably has a viscosity of from 100 to 3000 mPa·s, particularly preferably from 200 to 2500 mPa·s.

Component (a2)

According to the invention, at least one polyfunctional substituted aromatic amine (a2) having the general formula I

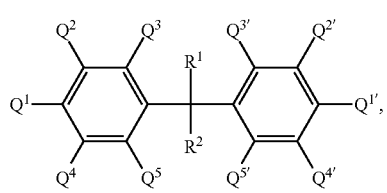

(I)

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group, is/are reacted as component (a2) in the presence of a solvent (C).

In a preferred embodiment, $Q^2$, $Q^4$, $Q^{2'}$ and $Q^{4'}$ are selected so that the compound having the general formula I has at least one linear or branched alkyl group, which can bear further functional groups, having from 1 to 12 carbon atoms in the α position relative to at least one primary amino group bound to the aromatic ring. Component (a2) in this case comprises polyfunctional aromatic amines (a2-s).

For the purposes of the present invention, polyfunctional amines are amines which have at least two amino groups which are reactive toward isocyanates per molecule. Here, primary and secondary amino groups are reactive toward isocyanates, with the reactivity of primary amino groups generally being significantly higher than that of secondary amino groups.

The amount of component (a2) used is preferably at least 0.2, in particular at least 0.4, particularly preferably at least 0.7% by weight, especially at least 1% by weight. The amount of component (a2) used is preferably at most 25% by weight, in particular at most 23% by weight, particularly preferably at most 20% by weight, especially at most 18% by weight, in each case based on the total weight of the components (a1) to (a4). In a very particularly preferred embodiment, the amount of component (a2) used is at least 5 and at most 20% by weight, based on the total weight of the components (a1) to (a4).

According to the invention, $R^1$ and $R^2$ in the general formula I are identical or different and are each selected independently from among hydrogen, a primary amino group and a linear or branched alkyl group having from 1 to 6 carbon atoms. $R^1$ and $R^2$ are preferably selected from among hydrogen and methyl. Particular preference is given to $R^1 = R^2 = H$.

In a particularly preferred embodiment $Q^2$, $Q^4$, $Q^{2'}$ and $Q^{4'}$ are selected so that the substituted aromatic amine (a2-s) comprises at least two primary amino groups, where in each case one or two linear or branched alkyl groups having from 1 to 12 carbon atoms are located in the α position relative to the primary amino groups bound to the aromatic ring, where the alkyl groups may optionally bear further functional groups. If one or more of $Q^2$, $Q^4$, $Q^{2'}$ and $Q^{4'}$ are selected so that they correspond to linear or branched alkyl groups which have from 1 to 12 carbon atoms and bear further functional groups, preference is given to amino groups and/or hydroxy groups and/or halogen atoms as such functional groups.

The reduced reactivity brought about by the abovementioned alkyl groups in the α position leads, in combination with the use of the component (a4) described in more detail below, to particularly stable gels having particularly good thermal conductivities in the ventilated state.

The alkyl groups as substituents Q in the general formula I are preferably selected from among methyl, ethyl, n-propyl, isopropyl, n-butyl, sec-butyl and tert-butyl.

The amines (a2-s) are preferably selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are each selected independently from among linear or branched alkyl groups which have from 1 to 12 carbon atoms and can bear further functional groups. The abovementioned alkyl groups are preferably methyl, ethyl, n-propyl, i-propyl, n-butyl, sec-butyl or t-butyl (in each case unsubstituted).

In one embodiment, one, more than one or all hydrogen atoms of one or more alkyl groups of the substituents Q can have been replaced by halogen atoms, in particular chlorine. As an alternative, one, more than one or all hydrogen atoms of one or more alkyl groups of the substituents Q can have been replaced by $NH_2$ or OH. However, the alkyl groups in the general formula I are preferably made up of carbon and hydrogen.

In a particularly preferred embodiment, component (a2) comprises 3,3',5,5'-tetraalkyl-4,4'-diaminodiphenylmethane, where the alkyl groups can be identical or different and are each selected independently from among linear or branched alkyl groups which have from 1 to 12 carbon atoms and can optionally bear functional groups. The abovementioned alkyl groups are preferably selected from among unsubstituted alkyl groups, in particular methyl, ethyl, n-propyl, isopropyl, n-butyl, sec-butyl and tert-butyl, particularly preferably methyl and ethyl. Very particular preference is given to 3,3', 5,5'-tetraethyl-4,4'-diaminodiphenylmethane and/or 3,3',5, 5'-tetramethyl-4,4'-diaminodiphenylmethane.

The abovementioned polyfunctional amines of the type (a2-s) are known per se to those skilled in the art or can be prepared by known methods. One of the known methods is the reaction of aniline or derivatives of aniline with formaldehyde in the presence of an acid catalyst, in particular the reaction of 2,4- or 2,6-dialkylaniline.

The component (a2) can optionally also comprise polyfunctional aromatic amines (a2-u) which differ from the amines of the structure (a2-s). The aromatic amines (a2-u) preferably have exclusively aromatically bound amino groups, but can also have both (cyclo)aliphatically and aromatically bound reactive amino groups.

Suitable polyfunctional aromatic amines (a2-u) are, in particular, isomers and derivatives of diaminodiphenylmethane. Isomers and derivatives of diaminodiphenylmethane which are preferred as constituents of component (a2) are, in particular, 4,4'-diaminodiphenylmethane, 2,4'-diaminodiphenylmethane, 2,2'-diaminodiphenylmethane and oligomeric diaminodiphenylmethane.

Further suitable polyfunctional aromatic amines (a2-u) are, in particular, isomers and derivatives of toluenediamine. Isomers and derivatives of toluenediamine which are preferred as constituents of component (a2) are, in particular, toluene-2,4-diamine and/or toluene-2,6-diamine and diethyltoluenediamines, in particular 3,5-diethyltoluene-2,4-diamine and/or 3,5-diethyltoluene-2,6-diamine.

In a first, particularly preferred embodiment, component (a2) consists exclusively of polyfunctional aromatic amines of the type (a2-s). In a second preferred embodiment, component (a2) comprises polyfunctional aromatic amines of the types (a2-s) and (a2-u). In the latter, second preferred embodiment, the component (a2) preferably comprises at least one polyfunctional aromatic amine (a2-u), of which at least one is selected from among isomers and derivatives of diaminodiphenylmethane (MDA).

In the second preferred embodiment, component (a2) correspondingly particularly preferably comprises at least one polyfunctional aromatic amine (a2-u) selected from among 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more methylene-bridged condensation products of aniline and formaldehyde having a plurality of rings. Oligomeric MDA comprises at least one oligomer, but in general a plurality of oligomers, of MDA having a functionality of more than 2, in particular 3 or 4 or 5. Oligomeric MDA is known or can be prepared by methods known per se. Oligomeric MDA is usually used in the form of mixtures with monomeric MDA.

The (average) functionality of a polyfunctional amine (a2-u) comprising oligomeric MDA can vary in the range from about 2.3 to about 5, in particular from 2.3 to 3.5 and in particular from 2.3 to 3. One such mixture of MDA-based polyfunctional amines having differing functionalities is, in particular, crude MDA which is formed, in particular, as intermediate in the condensation of aniline with formaldehyde, usually catalyzed by hydrochloric acid, in the production of crude MDI.

In the abovementioned preferred second embodiment, particular preference is given to the component (a2) comprising oligomeric diaminodiphenylmethane as compound (a2-u) and having an overall functionality of at least 2.1.

The proportion of amines of type (a2-s) having the general formula I based on the total weight of all polyfunctional amines of the component (a2), which thus add up to a total of 100% by weight, is preferably from 10 to 100% by weight, in particular from 30 to 100% by weight, very particularly preferably from 50 to 100% by weight, in particular from 80 to 100% by weight.

The proportion of polyfunctional aromatic amines (a2-u) which differ from the amines of type (a2-s) based on the total weight of all polyfunctional amines of the component (a2) is preferably from 0 to 90% by weight, in particular from 0 to 70% by weight, particularly preferably from 0 to 50% by weight, in particular from 0 to 20% by weight.

Component a3

Component (a3) is water. If water is used, the preferred amount of water used is at least 0.01% by weight, in particular at least 0.1% by weight, particularly preferably at least 0.5% by weight, in particular at least 1% by weight. If water is used, the preferred amount of water used is at most 15% by weight, in particular at most 13% by weight, particularly preferably at most 11% by weight, in particular at most 10% by weight, very particularly preferably at most 9% by weight, in particular at most 8% by weight, in each case based on the total weight of the components (a1) to (a4), which is 100% by weight.

A calculated content of amino groups can be derived from the water content and the content of reactive isocyanate groups of the component (a1) by assuming complete reaction of the water with the isocyanate groups of the component (a1) to form a corresponding number of amino groups and adding this content to the content resulting from component (a2) (total $n^{amine}$). The resulting use ratio of the calculated remaining NCO groups $n^{NCO}$ to the amino groups calculated to have been formed and used will hereinafter be referred to as calculated use ratio $n^{NCO}/n^{amine}$ and is an equivalence ratio, i.e. a molar ratio of the respective functional groups.

Water reacts with the isocyanate groups to form amino groups and liberate $CO_2$. Polyfunctional amines are therefore partially produced as intermediate (in situ). In the further course of the reaction, they are reacted with isocyanate groups to form urea linkages. The production of amines as intermediate leads to porous materials having particularly high mechanical stability and low thermal conductivity. However, the $CO_2$ formed must not disrupt gelling to such an extent that the structure of the resulting porous material is influenced in an undesirable way. This gives the abovementioned preferred upper limits for the water content based on the total weight of the components (a1) to (a4).

In this case, the calculated use ratio (equivalence ratio) $n^{NCO}/n^{amine}$ is preferably from 1.01 to 5. The equivalence ratio mentioned is particularly preferably from 1.1 to 3, in particular from 1.1 to 2. An excess of $n^{NCO}$ over $n^{amine}$ leads, in this embodiment, to lower shrinkage of the porous material, in particular xerogel, in the removal of the solvent and as a result of synergistic interaction with the catalyst (a4) to an improved network structure and to improved final properties of the resulting porous material.

The components (a1) to (a4) will hereinafter be referred to collectively as organic gel precursor (A). It will be obvious to a person skilled in the art that the partial reaction of the component (a1) to (a4) leads to the actual gel precursor (A) which is subsequently converted into a gel.

Catalyst (a4)

The amount of component (a4) used is preferably at least 6% by weight, in particular at least 7% by weight, particularly preferably at least 8% by weight, in particular at least 9% by weight. The amount of component (a4) used is preferably at most 30% by weight, in particular at most 28% by weight, particularly preferably at most 24% by weight, in particular at most 21% by weight, in each case based on the total weight of the components (a1) to (a4).

Possible catalysts are in principle all catalysts known to those skilled in the art which accelerate the trimerization of isocyanates (known as trimerization catalysts) and/or the reaction of isocyanates with amino groups (known as gelling catalysts) and/or the reaction of isocyanates with water (known as blowing catalysts).

The corresponding catalysts are known per se and have different relative activities in respect of the abovementioned three reactions. Depending on the relative activity, they can thus be assigned to one or more of the abovementioned types. Furthermore, it will be known to a person skilled in the art that reactions other than those mentioned above can also occur.

Corresponding catalysts can be characterized, inter alia, according to their gelling to blowing ratio, as is known, for example, from Polyurethane, $3^{rd}$ edition, G. Oertel, Hanser Verlag, Munich, 1993.

Preferred catalysts (a4) have a balanced gelling to blowing ratio, so that the reaction of the component (a1) with water is not too strongly accelerated, leading to an adverse effect on the network structure, and at the same time results in a short gelling time so that the demolding time is advantageously short. Preferred catalysts at the same time have a significant activity in respect of trimerization. This favorably influences the homogeneity of the network structure, resulting in particularly advantageous mechanical properties.

The catalysts can be able to be incorporated as a monomer building block (incorporatable catalyst) or not be able to be incorporated.

Catalysts suitable as component (a4) are in particular selected from the group consisting of primary, secondary and tertiary amines, triazine derivatives, organic metal compounds, metal chelates, organophosphorus compounds, in particular oxides of phospholenes, quaternary ammonium salts, ammonium hydroxides, alkali metal and alkaline earth metal hydroxides, alkali metal and alkaline earth metal alkoxides and ammonium and metal salts of carboxylic acids.

Suitable organophosphorus compounds, in particular oxides of phospholenes, are, for example, 1-methylphospholene oxide, 3-methyl-1-phenylphospholene oxide, 1-phenylphospholene oxide, 3-methyl-1-benzylphospholene oxide.

The suitable catalysts are preferably trimerization catalysts. Suitable trimerization catalysts are in particular strong bases, for example quaternary ammonium hydroxides such as tetraalkylammonium hydroxides having from 1 to 4 carbon atoms in the alkyl radical and benzyltrimethylammonium hydroxide, alkali metal hydroxides such as potassium or sodium hydroxide and alkali metal alkoxides such as sodium methoxide, potassium and sodium ethoxide and potassium isopropoxide.

Further suitable trimerization catalysts are, in particular, the ammonium and metal salts of carboxylic acids described further below and N-hydroxyalkyl quaternary ammonium carboxylates, e.g. trimethylhydroxypropylammonium formate.

Tertiary amines are also known per se to those skilled in the art as trimerization catalysts. Tertiary amines, i.e. compounds having at least one tertiary amino group, are particularly preferred as catalysts (a4). Suitable tertiary amines having distinct properties as trimerization catalysts are, in particular, N,N',N''-tris(dialkylaminoalkyl)-s-hexahydrotriazines, such as N,N',N''-tris(dimethylaminopropyl)-s-hexahydrotriazine, tris(dimethylaminomethyl)phenol.

Metal-organic compounds are known per se as gel catalysts to a person skilled in the art. Tin-organic compounds such as tin 2-ethylhexanoate and dibutyltin dilaurate are particularly preferred.

Tertiary amines are also known per se as gel catalysts to a person skilled in the art. As mentioned above, tertiary amines are particularly preferred as catalysts (a4). Suitable tertiary amines having good properties as gel catalysts are, in particular, N,N-dimethylbenzylamine, N,N'-dimethylpiperazine and N,N-dimethylcyclohexylamine and also dimethylcyclohexylamine, bis(2-dimethylaminoethyl) ether, N,N,N,N,N-pentamethyldiethylenetriamine, methylimidazole, dimethylimidazole, aminopropylimidazole, dimethylbenzylamine, 1,6-diazabicyclo[5.4.0]undec-7-ene, triethylamine, triethylenediamine (1,4-diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, methyldiethanolamine and butyldiethanolamine.

Catalysts which are particularly preferred as component (a4) are selected from the group consisting of dimethylcyclohexylamine, dimethylpiperazine, bis(2-dimethylaminoethyl) ether, N,N,N,N,N-pentamethyldiethylenetriamine, methylimidazole, dimethylimidazole, aminopropylimidazole, dimethylbenzylamine, 1,6-diazabicyclo-[5.4.0]undec-7-ene, trisdimethylaminopropylhexahydrotriazine, triethylamine, tris(dimethylaminomethyl)phenol, triethylenediamine(diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, methyldiethanolamine, butyldiethanolamine, metal acetylacetonates, ammonium ethylhexanoates and metal ethylhexanoates. Very particular preference is given to dimethylcyclohexylamine, dimethylpiperazine, methylimidazole, dimethylimidazole, dimethylbenzylamine, 1,6-diazabicyclo[5.4.0]-undec-7-ene, trisdimethylaminopropylhexahydrotriazine, triethylamine, tris(dimethylaminomethyl)phenol, triethylenediamine(diazabicyclo[2.2.2]octane), dimethylaminoethanolamine, dimethylaminopropylamine, N,N,N-trimethylaminoethylethanolamine, triethanolamine, diethanolamine, methyldiethanolamine, butyldiethanolamine, ammonium ethylhexanoates and metal ethylhexanoates.

In addition, very particular preference is given to using carboxylates as catalyst. Preferred carboxylates have an alkali metal, alkaline earth metal or ammonium ion as cation, i.e. they are corresponding salts of carboxylic acids. Preferred carboxylates are formates, acetates, 2-ethylhexanoates, trifluoroacetates, adipates, benzoates and saturated or unsaturated long-chain fatty acid salts which have from 10 to 20 carbon atoms and optionally have OH groups on the side group.

Very particularly preferred catalysts are selected from among potassium formate, sodium acetate, potassium acetate, cesium acetate, potassium 2-ethylhexanoate, potassium trifluoroacetate, potassium adipate, sodium benzoate and alkali metal salts of saturated or unsaturated long-chain fatty acid salts which have from 10 to 20 carbon atoms and optionally have OH groups on the side group.

According to the present invention, the reaction takes place in the presence of a solvent (C).

For the purposes of the present invention, the term solvent (C) comprises liquid diluents, i.e. both solvents in the narrower sense and also dispersion media. The mixture can, in particular, be a true solution, a colloidal solution or a dispersion, e.g. an emulsion or suspension. The mixture is preferably a true solution. The solvent (C) is a compound which is liquid under the conditions of step (a), preferably an organic solvent.

The solvent (C) can in principle be an organic compound or a mixture of a plurality of compounds, with the solvent (C) being liquid under the temperature and pressure conditions under which the mixture is provided in step (a) (dissolution conditions for short). The composition of the solvent (C) is selected so that it is able to dissolve or disperse, preferably dissolve, the organic gel precursor. Preferred solvents (C) are those which are a solvent for the organic gel precursor (A), i.e. ones which dissolve the organic gel precursor (A) completely under the reaction conditions.

The reaction product of the reaction in the presence of the solvent (C) is initially a gel, i.e. a viscoelastic chemical network which is swollen by the solvent (C). A solvent (C) which is a good swelling agent for the network formed in step (b) generally leads to a network having fine pores and a small average pore diameter, while a solvent (C) which is a poor swelling agent for the gel resulting from step (b) generally leads to a coarse-pored network having a large average pore diameter.

The choice of the solvent (C) thus influences the desired pore size distribution and the desired porosity. The choice of the solvent (C) is also generally made in such a way that precipitation or flocculation due to formation of a precipitated reaction product does not occur to a significant extent during or after step (b) of the process of the invention.

When a suitable solvent (C) is chosen, the proportion of precipitated reaction product is usually less than 1% by weight, based on the total weight of the mixture. The amount of precipitated product formed in a particular solvent (C) can be determined gravimetrically by filtering the reaction mixture through a suitable filter before the gelling point.

Possible solvents (C) are the solvents known from the prior art for isocyanate-based polymers. Preferred solvents are those which are a solvent for the components (a1) to (a4), i.e. solvents which dissolve the constituents of the components (a1) to (a4) virtually completely under the reaction conditions. The solvent (C) is preferably inert, i.e. unreactive, toward component (a1).

Possible solvents (C) are, for example, ketones, aldehydes, alkyl alkanoates, amides such as formamide and N-methylpyrrollidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible.

Further possibilities as solvent (C) are acetals, in particular diethoxymethane, dimethoxymethane and 1,3-dioxolane.

Dialkyl ethers and cyclic ethers are likewise suitable as solvents (C). Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

Aldehydes and/or ketones are particularly preferred as solvents (C). Aldehydes or ketones suitable as solvents (C) are, in particular, those corresponding to the general formula $R^2$—(CO)—$R^1$, where $R^1$ and $R^2$ are each hydrogen or an alkyl group having 1, 2, 3 or 4 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, methyl isobutyl ketone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone and acetophenone. The abovementioned aldehydes and ketones can also be used in the form of mixtures. Ketones and aldehydes having alkyl groups having up to 3 carbon atoms per substituent are preferred as solvents (C). Particular preference is given to methyl ethyl ketone.

Further preferred solvents are alkyl alkanoates, in particular methyl formate, methyl acetate, ethyl formate, butyl acetate, ethyl acetate and ethyl acetoacetate. Ethyl acetate is particularly preferred. Preferred halogenated solvents are described in WO 00/24799, page 4, line 12 to page 5, line 4.

In many cases, particularly suitable solvents (C) are obtained by using two or more completely miscible compounds selected from the abovementioned solvents in the form of a mixture.

To obtain a sufficiently stable gel which does not shrink too much during drying in step (c) in step (b), the proportion of the components (a1) to (a4) based on the total weight of the components (a1) to (a4) and the solvent (C), which is 100% by weight, must generally be not less than 5% by weight. The proportion of the components (a1) to (a4) based on the total weight of the components (a1) to (a4) and the solvent (C), which is 100% by weight, is preferably at least 6% by weight, particularly preferably at least 8% by weight, in particular at least 10% by weight.

On the other hand, the concentration of the components (a1) to (a4) in the mixture provided must not be too high since otherwise no porous material having favorable properties is obtained. In general, the proportion of the components (a1) to (a4) based on the total weight of the components (a1) to (a4) and the solvent (C), which is 100% by weight, is not more than 40% by weight. The proportion of the components (a1) to (a4) based on the total weight of the components (a1) to (a4) and the solvent (C), which is 100% by weight, is preferably not more than 35% by weight, particularly preferably not more than 25% by weight, in particular not more than 20% by weight.

The total proportion by weight of the components (a1) to (a4) based on the total weight of the components (a1) to (a4) and the solvent (S), which is 100% by weight, is preferably from 8 to 25% by weight, in particular from 10 to 20% by weight, particularly preferably from 12 to 18% by weight. Adherence to the amount of the starting materials in the range mentioned leads to porous materials having a particularly advantageous pore structure, low thermal conductivity and low shrinking during drying.

Before the reaction, it is necessary to mix the components used, in particular to mix them homogeneously. The rate of mixing should be high relative to the rate of the reaction in order to avoid mixing defects. Appropriate mixing methods are known per se to those skilled in the art.

Preferred process for producing the porous materials

In a preferred embodiment, the process of the invention comprises at least the following steps:
 (a) provision of the components (a1) to (a4) and the solvent (C) as described above,
 (b) reaction of the components (a1) to (a4) in the presence of the solvent (C) to form a gel and
 (c) drying of the gel obtained in the preceding step.

Preferred embodiments of steps (a) to (c) will be described in detail below.

Step (a)

According to the invention, the components (a1) to (a4) and the solvent (C) are provided in step (a).

The components (a1) and (a2) are preferably provided separately from one another, each in a suitable partial amount of the solvent (C). The separate provision makes it possible for the gelling reaction to be optimally monitored or controlled before and during mixing.

Component (a3) and (a4) is particularly preferably provided as a mixture with component (a2), i.e. separately from component (a1). This avoids the reaction of water or of the component (a4) with component (a1) to form networks without the presence of component (a2). The prior mixing of water with component (a1) otherwise leads to less favorable properties in respect of the homogeneity of the pore structure and the thermal conductivity of the resulting materials.

The mixture or mixtures provided in step (a) can also comprise customary auxiliaries known to those skilled in the art as further constituents. Mention may be made by way of example of surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, IR opacifiers, reinforcing materials and biocides.

Further information regarding the abovementioned auxiliaries and additives may be found in the specialist literature, e.g. in Plastics Additive Handbook, 5th edition, H. Zweifel, ed. Hanser Publishers, Munich, 2001.

Step (b)

According to the invention, the reaction of the components (a1) to (a4) takes place in the presence of the solvent (C) to form a gel in step (b). To carry out the reaction, a homogeneous mixture of the components provided in step (a) firstly has to be produced.

The provision of the components provided in step (a) can be carried out in a conventional way. A stirrer or another mixing device is preferably used here in order to achieve good and rapid mixing. The time required for producing the homogeneous mixture should be short in relation to the time during which the gelling reaction leads to at least partial formation of a gel, in order to avoid mixing defects. The other mixing conditions are generally not critical; for example, mixing can be carried out at from 0 to 100° C. and from 0.1 to 10 bar (absolute), in particular at, for example, room temperature and atmospheric pressure. After a homogeneous mixture has been produced, the mixing apparatus is preferably switched off.

The gelling reaction is a polyaddition reaction, in particular a polyaddition of isocyanate groups and amino groups.

For the purposes of the present invention, a gel is a crosslinked system based on a polymer which is present in contact with a liquid (known as Solvogel or Lyogel, or with water as liquid: aquagel or hydrogel). Here, the polymer phase forms a continuous three-dimensional network.

In step (b) of the process of the invention, the gel is usually formed by allowing to rest, e.g. by simply allowing the container, reaction vessel or reactor in which the mixture is present (hereinafter referred to as gelling apparatus) to stand. The mixture is preferably no longer stirred or mixed during gelling (gel formation) because this could hinder formation of the gel. It has been found to be advantageous to cover the mixture during gelling or to close the gelling apparatus.

Gelling is known per se to a person skilled in the art and is described, for example, in WO-2009/027310 on page 21, line 19 to page 23, line 13, the contents of which are hereby fully incorporated by reference.

Step (c)

According to the invention, the gel obtained in the previous step is dried in step (c).

In a preferred embodiment, drying is carried out under supercritical conditions, preferably after replacement of the solvent by $CO_2$ or other solvents suitable for the purposes of supercritical drying. Such drying is known per se to a person skilled in the art. Supercritical conditions characterize a temperature and a pressure at which the fluid phase to be removed is present in the supercritical state. In this way, shrinkage of the gel body on removal of the solvent can be reduced.

The supercritical drying of the gel is preferably carried out in an autoclave. Here, supercritical $CO_2$ is particularly preferred, i.e. drying is preferably effected by extraction of the solvent by means of supercritical $CO_2$. The autoclave is preferably firstly filled with an organic solvent to such an extent that the gel is completely covered, whereupon the autoclave is closed. This makes it possible to prevent shrinkage of the gel occurring as a result of evaporation of the organic solvent before the gel comes into contact with supercritical $CO_2$.

In an alternative embodiment, the drying of the gel obtained is carried out by converting the solvent (C) into the gaseous state at a temperature and a pressure below the critical temperature and the critical pressure of the solvent (C). Accordingly, drying is preferably carried out by removing the solvent (C) which was present in the reaction without prior replacement by a further solvent.

Such methods are likewise known to those skilled in the art and are described in WO 2009/027310 on page 26, line 22 to page 28, line 36, the contents of which are hereby fully incorporated by reference.

Properties of the Porous Materials and Use

The present invention further provides the porous materials which can be obtained by the process of the invention. Aerogels are preferred as porous materials for the purposes of the present invention, i.e. the porous material which can be obtained according to the invention is preferably an aerogel.

The average pore diameter is determined by scanning electron microscopy and subsequent image analysis using a statistically significant number of pores. Corresponding methods are known to those skilled in the art.

The volume average pore diameter of the porous material is preferably not more than 4 microns. The volume average pore diameter of the porous material is particularly preferably not more than 3 microns, very particularly preferably not more than 2 microns and in particular not more than 1 micron.

Although a very small pore size combined with a high porosity is desirable from the point of view of a low thermal conductivity, from the point of view of production and to obtain a sufficiently mechanically stable porous material, there is a practical lower limit to the volume average pore diameter. In general, the volume average pore diameter is at least 50 nm, preferably at least 100 nm.

The porous material which can be obtained according to the invention preferably has a porosity of at least 70% by volume, in particular from 70 to 99% by volume, particularly preferably at least 80% by volume, very particularly preferably at least 85% by volume, in particular from 85 to 95% by volume. The porosity in % by volume means that the specified proportion of the total volume of the porous material comprises pores. Although a very high porosity is usually desirable from the point of view of a minimal thermal conductivity, an upper limit is imposed on the porosity by the mechanical properties and the processability of the porous material.

The components (a1) to (a3) and optionally (a4), as long as the catalyst can be incorporated, are present in reactive (polymer) form in the porous material which can be obtained according to the invention. Owing to the composition according to the invention, the monomer building blocks (a1) and (a2) are predominantly bound via urea linkages and/or via isocyanurate linkages in the porous material, with the isocyanurate groups being formed by trimerization of isocyanate groups of the monomer building blocks (a1). If the porous material comprises further components, further possible linkages are, for example, urethane groups formed by reaction of isocyanate groups with alcohols or phenols.

The determination of the mol % of the linkages of the monomer building blocks in the porous material is carried out by means of NMR spectroscopy (nuclear magnetic resonance) in the solid or in the swollen state. Suitable methods of determination are known to those skilled in the art.

The density of the porous material which can be obtained according to the invention is usually from 20 to 600 g/l, preferably from 50 to 500 g/l and particularly preferably from 70 to 200 g/l.

The process of the invention gives a coherent porous material and not only a polymer powder or particles. Here, the three-dimensional shape of the resulting porous material is determined by the shape of the gel which is in turn determined by the shape of the gelling apparatus. Thus, for example, a cylindrical gelling vessel usually gives an approximately cylindrical gel which can then be dried to give a porous material having a cylindrical shape.

The porous materials which can be obtained according to the invention have advantageous thermal properties and also advantageous materials properties such as simple processability and high mechanical stability, for example low brittleness. The porous materials have a low density and in addition have a small average pore size. The combination of the above-mentioned properties allows the materials to be used according to the invention as insulation material for thermal insulation, in particular for applications in vacuum insulation panels and as building materials; the good thermal insulation effect in the ventilated state is particularly advantageous in the field of building materials.

EXAMPLES

The thermal conductivity $\lambda$ was determined in accordance with DIN EN 12667 using a plate instrument from Hesto (Lambda Control A50).

The following compounds were used:

Component a1:
Oligomeric MDI (Lupranat® M200) having an NCO content of 30.9 g per 100 g in accordance with ASTM D-5155-96 A, a functionality in the region of three and a viscosity of 2100 mPa·s at 25° C. in accordance with DIN 53018 (hereinafter "compound M200").

Component a2:
3,3',5,5'-Tetraethyl-4,4'-diaminodiphenylmethane (hereinafter "MDEA").

Catalysts a4:
Triethanolamine, triethylenediamine (IUPAC: 1,4-diazabicyclo[2.2.2]octane) and methyldiethanolamine.

Example 1

80 g of the compound M200 were dissolved while stirring at 20° C. in 220 g of 2-butanone in a glass beaker. 4 g of the compound MDEA and 12 g of triethanolamine were dissolved in 220 g of 2-butanone in a second glass beaker. The two solutions from step (a) were mixed. This gave a clear, low-viscosity mixture. The mixture was allowed to stand at room temperature for 24 hours to effect curing. The gel was subsequently taken from the glass beaker and dried by solvent extraction as described below using supercritical $CO_2$ in an autoclave.

The gel monolith was taken from the glass beaker and transferred to a 250 ml autoclave. The autoclave was filled with acetone having a purity of >99% so that the monolith was completely covered by acetone and subsequently closed. The monolith was dried in a stream of $CO_2$ for 24 hours. The pressure (in the drying system) was in the range from 115 to 120 bar; the temperature was 40° C. At the end, the pressure in the system was reduced in a controlled manner to atmospheric pressure over a period of about 45 minutes at a temperature of 40° C. The autoclave was opened and the dried monolith was taken out.

The porous material obtained had a density of 168 g/l. the thermal conductivity was 22.3 mW/m*K at 10° C.

Example 2

80 g of the compound M200 were dissolved while stirring at 20° C. in 250 g of ethyl acetate in a glass beaker. 4 g of the compound MDEA and 12 g of methyldiethanolamine were dissolved in 250 g of ethyl acetate in a second glass beaker. The two solutions from step (a) were mixed. This gave a clear, low-viscosity mixture. The mixture was allowed to stand at room temperature for 24 hours to effect curing. In a manner corresponding to example 1, the gel was subsequently taken from the glass beaker and dried by solvent extraction with supercritical $CO_2$ in an autoclave.

The porous material obtained had a density of 165 g/l. The thermal conductivity was 20.9 mW/m*K at 10° C.

Example 3

80 g of the compound M200 were dissolved while stirring at 20° C. in 220 g of 2-butanone in a glass beaker. 4 g of the compound MDEA and 8 g of triethylenediamine were dissolved in 220 g of 2-butanone in a second glass beaker. The two solutions from step (a) were mixed. This gave a clear, low-viscosity mixture. The mixture was allowed to stand at room temperature for 24 hours to effect curing. In a manner corresponding to example 1, the gel was subsequently taken from the glass beaker and dried by solvent extraction with supercritical $CO_2$ in an autoclave.

The porous material obtained had a density of 155 g/l. The thermal conductivity was 20.6 mW/m*K at 10° C.

Example 4

48 g of the compound M200 were dissolved while stirring at 20° C. in 220 g of 2-butanone in a glass beaker. 8 g of the compound MDEA and 8 g of methyldiethanolamine and also 1 g of water were dissolved in 220 g of 2-butanone in a second glass beaker. The two solutions from step (a) were mixed. This gave a clear, low-viscosity mixture. The mixture was allowed to stand at room temperature for 24 hours to effect curing. In a manner corresponding to example 1, the gel was subsequently taken from the glass beaker and dried by solvent extraction with supercritical $CO_2$ in an autoclave.

The porous material obtained had a density of 130 g/l. The thermal conductivity was 19.5 mW/m*K at 10° C.

Example 5C 80 g of the compound M200 were dissolved while stirring at 20° C. in 220 g of 2-butanone in a glass beaker. 4 g of the compound MDEA and 1 g of triethanolamine were dissolved in 220 g of 2-butanone in a second glass beaker. The two solutions from step (a) were mixed. This gave a clear, low-viscosity mixture. The mixture was allowed to stand at room temperature for 24 hours to effect curing. The gel had a slurry-like consistency and could not be demolded.

Example 6C 80 g of the compound M200 were dissolved while stirring at 20° C. in 220 g of 2-butanone in a glass beaker. 4 g of the compound MDEA and 3 g of triethanolamine were dissolved in 220 g of 2-butanone in a second glass beaker. The two solutions from step (a) were mixed. This gave a clear, low-viscosity mixture. The mixture was allowed to stand at room temperature for 24 hours to effect curing. The gel had a slurry-like consistency and could not be demolded.

Example 7C 80 g of the compound M200 were dissolved while stirring at 20° C. in 250 g of ethyl acetate in a glass beaker. 4 g of the compound MDEA and 1 g of methyldiethanolamine were dissolved in 250 g of ethyl acetate in a second glass beaker. The two solutions from step (a) were mixed. This gave a clear, low-viscosity mixture. The mixture was allowed to stand at room temperature for 24 hours to effect curing. The gel had a slurry-like consistency and could not be demolded.

Example 8C 80 g of the compound M200 were dissolved while stirring at 20° C. in 250 g of ethyl acetate in a glass beaker. 4 g of the compound MDEA and 2 g of methyldiethanolamine were dissolved in 250 g of ethyl acetate in a second glass beaker. The two solutions from step (a) were mixed. This gave a clear, low-viscosity mixture. The mixture was allowed to stand at room temperature for 24 hours to effect curing. The gel had a slurry-like consistency and could not be demolded.

Example 9C 80 g of the compound M200 were dissolved while stirring at 20° C. in 220 g of 2-butanone in a glass beaker. 4 g of the compound MDEA and 1 g of triethylenediamine were dissolved in 220 g of 2-butanone in a second glass beaker. The two solutions from step (a) were mixed. This gave a clear, low-viscosity mixture. The mixture was allowed to stand at room temperature for 24 hours to effect curing. The gel had a slurry-like consistency and could not be demolded.

Example 10C 48 g of the compound M200 were dissolved while stirring at 20° C. in 220 g of 2-butanone in a glass beaker. 8 g of the compound MDEA and 1 g of methyldiethanolamine and also 1 g of water were dissolved in 220 g of 2-butanone in a second glass beaker. The two solutions from step (a) were mixed. This gave a clear, low-viscosity mixture. The mixture was allowed to stand at room temperature for 24 hours to effect curing. The gel had a slurry-like consistency and could not be demolded.

The invention claimed is:
1. A process for producing a porous material, the process comprising reacting:
   (a1) from 25 to 94.9% by weight of at least one polyfunctional isocyanate;
   (a2) from 0.1 to 30% by weight of at least one polyfunctional aromatic amine having the general formula (I);

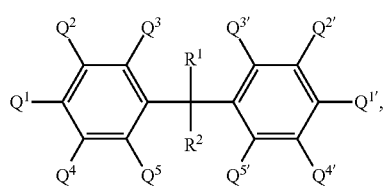

wherein:
   $R^1$ and $R^2$ can be identical or different and are each selected independently from among hydrogen and linear or branched alkyl groups having from 1 to 6 carbon atoms; and
   all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups,
   with the proviso that the amine of formula (I) comprises at least two primary amino groups, where at least one of $Q^1$, $Q^3$, and $Q^5$ is a primary amino group and at least one of $Q^{1'}$, $Q^{3'}$, and $Q^{5'}$ is a primary amino group;
   (a3) from 5 to 30% by weight of at least one catalyst, in each case based on the total weight of the components (a1) to (a3),
   wherein the % by weight of the components (a1) to (a3) add up to 100% by weigh,
   wherein no water is present, and
   wherein the reaction is occurs in the presence of a solvent (C) which is removed after the reaction.

2. The process according to claim 1 which comprises reacting
   from 35 to 93.8% by weight of component (a1),
   from 0.2 to 25% by weight of component (a2), and
   from 6 to 30% by weight of component (a3),
in each case based on the total weight of the components (a1) to (a3), where the % by weight of the components (a1) to (a3) add up to 100% by weight.

3. The process according to claim 1, wherein at least 5% by weight and at most 20% by weight of component (a2) are used, based on the total weight of the components (a1) to (a3).

4. The process according to claim 1, which comprises reacting
   from 52 to 92.5% by weight of component (a1),
   from 0.5 to 18% by weight of component (a2), and
   from 7 to 24% by weight of component (a3),
in each case based on the total weight of the components (a1) to (a3), where the % by weight of the components (a1) to (a3) add up to 100% by weight.

5. The process according to claim 1, wherein $Q^2$, $Q^4$, $Q^{2'}$ and $Q^{4'}$ are selected so that the aromatic amine (a2) having the general formula (I) comprises at least two primary amino groups which each have a linear or branched alkyl group which can bear further functional groups, having from 1 to 12 carbon atoms, in the α position relative to at least one primary amino group bound to the aromatic ring.

6. The process according to claim 1, wherein the amine component (a2) comprises at least one compound selected from the group consisting of 3,3',5,5'-tetraalkyl-4,4'-diaminodiphenylmethane, 3,3',5,5'-tetraalkyl-2,2''-diaminodiphenylmethane and 3,3',5,5'-tetraalkyl-2,4'-diaminodiphenylmethane, where the alkyl groups in the 3, 3', 5 and 5' positions can be identical or different and are selected independently from among linear or branched alkyl groups which have from 1 to 12 carbon atoms and can bear further functional groups.

7. The process according to claim 1, wherein the alkyl groups of the polyfunctional aromatic amines (a2) having the general formula (I) are selected from among methyl, ethyl, n-propyl, isopropyl, n-butyl, sec-butyl and tert-butyl.

8. The process according to claim 1, wherein polyfunctional aromatic amines (a2) having the general formula (I) e 3,3',5,5'-tetraalkyl-4,4'-diaminodiphenylmethanes, preferably 3,3',5,5'-tetraethyl-4,4'-diaminodiphenylmethane and/or 3,3',5,5'-tetramethyl-4,4'-diaminodiphenylmethane.

9. The process according to claim 1, wherein component (a3) is selected from the group consisting of primary, secondary and tertiary amines, triazine derivatives, metal-organic compounds, metal chelates, oxides of phospholenes, quaternary ammonium salts, ammonium hydroxides and alkali metal and alkaline earth metal hydroxides, alkoxides and carboxylates.

10. The process according to claim 1, wherein component (a3) is selected from the group consisting of dimethylcyclohexylamine, bis(2-dimethylaminoethyl) ether, N,N,N,N,N-pentamethyldiethylenetriamine, methylimidazole, dimethylimidazole, aminopropylimidazole, dimethylbenzylamine, 1,6-diazabicyclo[5.4.0]undec-7-ene, trisdimethylaminopropylhexahydrotriazine, triethylamine, tris(dimethylaminomethyl)phen 1, triethylenediamine(diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, methyldiethanolamine, butyldiethanolamine, metal acetylacetonates, ammonium ethylhexanoates and metal ethylhexanoates.

11. The process according to claim 1, wherein component (a3) is selected from the group consisting of alkali metal carboxylates, alkaline earth metal carboxylates and ammonium carboxylates.

12. The process according to claim w component (a3) comprises potassium 2-ethylhexanoate.

13. The process according to claim 1, comprising:
   a) reacting the components (a1), (a2), and (a3) in the solvent (C), to form a gel; and
   b) drying of the gel.

14. The process according to claim 13, wherein the components (a1) and (a2) to (a3) are provided separately, in each case in a partial amount of the solvent (C).

15. The process according to claim 13, wherein the drying of the gel occurs by converting a liquid comprised in the gel into the gaseous state at a temperature and a pressure below the critical temperature and the critical pressure of the liquid comprised in the gel.

16. The process according to claim 13, wherein the drying of the gel occurs under supercritical conditions.

17. A porous material obtained by the process of claim 1.

18. An insulation material or a vacuum insulation panel, comprising the porous material of claim 17.

* * * * *